(12) United States Patent
Kotsugai et al.

(10) Patent No.: US 7,798,906 B2
(45) Date of Patent: Sep. 21, 2010

(54) GAME SYSTEM AND GAME MANAGING SERVER

(75) Inventors: Yoshinori Kotsugai, Kanagawa (JP); Akihito Wada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 15 days.

(21) Appl. No.: 12/187,629

(22) Filed: Aug. 7, 2008

(65) Prior Publication Data

US 2009/0088256 A1    Apr. 2, 2009

(51) Int. Cl.
*G06F 17/00* (2006.01)

(52) U.S. Cl. ...................................... 463/42

(58) Field of Classification Search ............ 463/42, 463/16–25
See application file for complete search history.

(56) References Cited

U.S. PATENT DOCUMENTS

| | | | |
|---|---|---|---|
| 2001/0004609 A1* | 6/2001 | Walker et al. | 463/42 |
| 2006/0247955 A1* | 11/2006 | Humphrey | 705/5 |
| 2007/0191101 A1* | 8/2007 | Coliz et al. | 463/42 |
| 2007/0191102 A1* | 8/2007 | Coliz et al. | 463/42 |

FOREIGN PATENT DOCUMENTS

| | | |
|---|---|---|
| JP | 2001 120841 | 5/2001 |
| JP | 2001 157782 | 6/2001 |
| JP | 2002 085852 | 3/2002 |
| JP | 2002 346231 | 12/2002 |
| JP | 2005 034303 | 2/2005 |
| JP | 2005 052487 | 3/2005 |
| JP | 2005 267347 | 9/2005 |

OTHER PUBLICATIONS

Japanese Office Action No. 2006-039734 dated Jan. 6, 2009 and partial Translation of the Office Action.

* cited by examiner

*Primary Examiner*—Ronald Laneau
(74) *Attorney, Agent, or Firm*—Frommer Lawrence & Haug LLP; William S. Frommer; Paul A. Levy

(57) ABSTRACT

In a game management server that manages a network multiplayer game, a game-holding-prior-notice-receiving unit receives a date and time for a prospective multiplayer game being held, and conditions for holding the game, and the unit registers them into a database. An entry-reservation-receiving unit announces a prior notice of the meeting being held and calls for participants. A user who desires to participate requests the entry-reservation-receiving unit to make an entry reservation. When receiving the entry reservation, the entry-reservation-receiving unit registers the reservation into a database. When the date and time that the meeting is expected to be held arrives, the execution managing unit generates data necessary for executing the meeting and manages the execution of the meeting to be held. A result presenting unit presents the result of the meeting.

7 Claims, 5 Drawing Sheets

FIG.5

```
                                                                    200
┌─────────────────────────────────────────────────────────────────┐
│ HELD BY ○○ RANCH            ○○ DERBYSPRINT      FILLY 3         │
│                                        CLOSING                  │
│ ×× RACE TRACK   PARTICIPANTS    REGISTRATION 2006. 01. 19       │
│ LAWN 3000m      100 PEOPLE      RACE DATE 2006. 01. 19          │
│                                 ┌──────────┐ 201                │
│        10/10                    │RESERVATION│                   │
│                                 │ FOR ENTRY │                   │
├─────────────────────────────────────────────────────────────────┤
│ HELD BY ×× RANCH            ○○ DERBYGOLD        COLT 2          │
│                                        CLOSING                  │
│ ×× RACE TRACK   PARTICIPANT     REGISTRATION 2006. 01. 18       │
│ LAWN 1200m      1 PERSON        RACE DATE 2006. 01. 18          │
│        0/1                      REGISTRATION CLOSED             │
├─────────────────────────────────────────────────────────────────┤
│ HELD BY □□ RANCH            SILVERSTAKES        FILLY 2         │
│                                        CLOSING                  │
│ △△ RACE TRACK   PARTICIPANTS    REGISTRATION 2006. 01. 18       │
│ DIRT 3000m      48 PEOPLE       RACE DATE 2006. 01. 18          │
│                                 ┌─────────┐ 202                 │
│        2/3                      │ PERFORM │                     │
│                                 │  RACE   │                     │
├─────────────────────────────────────────────────────────────────┤
│ HELD BY ○○ RANCH            GOLDENSTAKES        COLT 2          │
│                                        CLOSING                  │
│ △△ RACE TRACK   PARTICIPANTS    REGISTRATION 2006. 01. 18       │
│ DIRT 1200m      10 PEOPLE       RACE DATE 2006. 01. 18          │
│                                 ┌─────────┐                     │
│        10/10                    │ANNOUNCE │                     │
│                                 │ RESULT  │                     │
└─────────────────────────────────────────────────────────────────┘
```

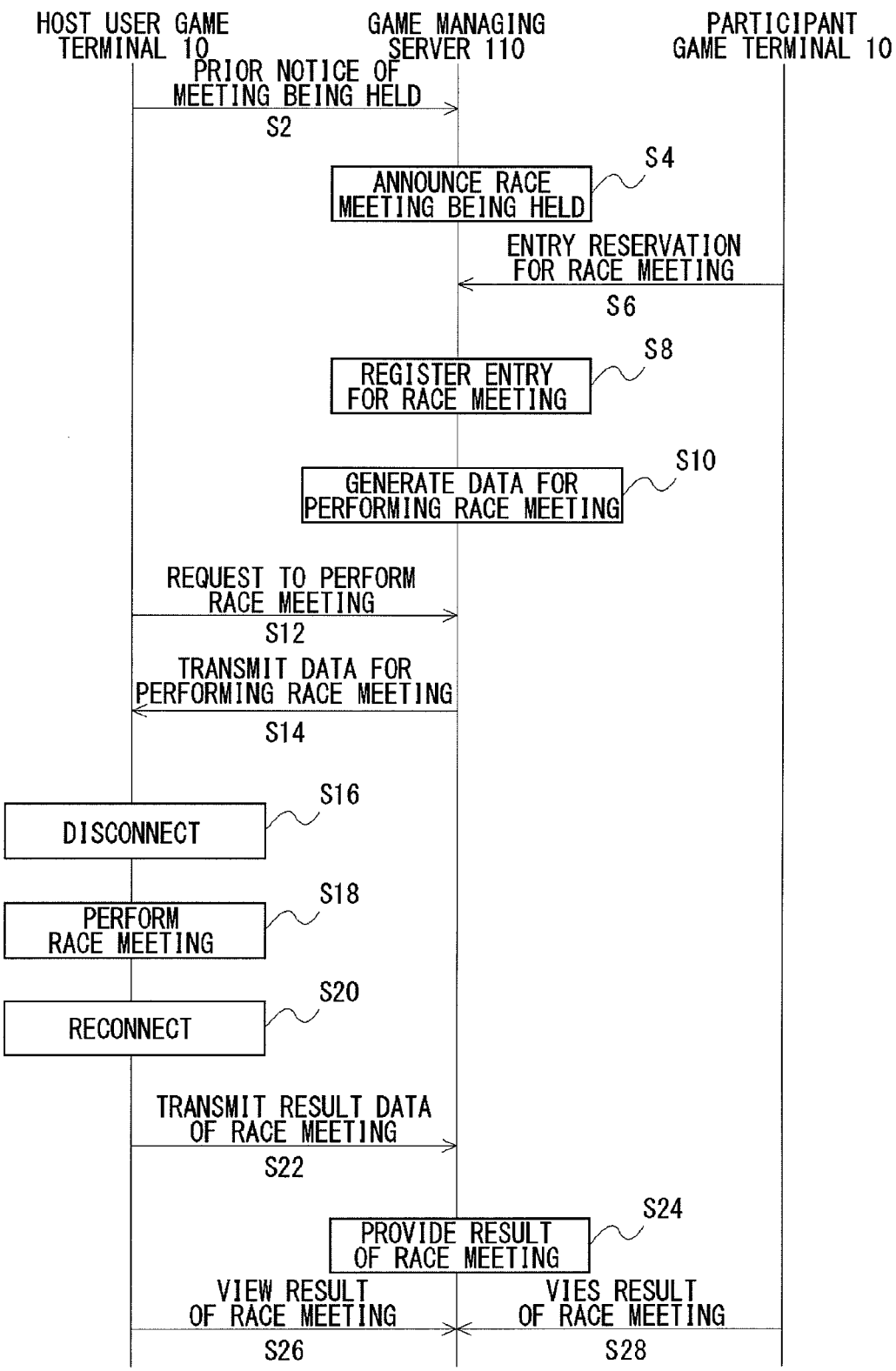

GAME SYSTEM AND GAME MANAGING SERVER

TECHNICAL FIELD

The present invention relates generally to a technique for controlling a game and particularly to a game system and a game managing server for managing a game that allows a player to contend with an opponent via a network.

BACKGROUND OF THE INVENTION

Multiplayer games that enable a player to play against an opponent via a network have been well-received. In a commonly-used multiplayer game utilizing a network, a game program running on a server manages the multiplayer game, and each user accesses the server to make the game progress.

DISCLOSURE OF THE INVENTION

In a conventional multiplayer game utilizing a network, when a user is about to enjoy the multiplayer game and access the server, sometimes an opponent player cannot be found. Even if an opponent player is found, the player is not always appropriate as an opponent player, because, for example, the experience levels of the user and the opponent player may differ too much to challenge appropriately.

The present invention has been made in view of such a problem and a general purpose thereof is to provide a technique for improving user friendliness of a multiplayer game that is played via a network.

In this background, according to one embodiment of the present invention, a game management server is provided. The game management server comprises; a game-holding-prior-notice-receiving unit operative to receive a prior notice of a multiplayer game being held and a request to call for entries to the multiplayer game from a terminal of a user who hosts the multiplayer game via a network; an entry-reservation-receiving unit operative to make the prior notice of the multiplayer game being held open via the network, and operative to receive an entry reservation for the multiplayer game from a terminal of a user who will participate in the multiplayer game; and a game management unit operative to manage the multiplayer game to be held, wherein the game-holding-prior-notice-receiving unit receives a date and time the multiplayer game is expected to be held, and the entry-reservation-receiving unit presents the date and time the multiplayer game is expected to be held and receives an entry reservation.

According to another embodiment of the present invention, a game system is provided. The game system comprises; a game management server operative to manage a multiplayer game to be held; and a terminal of a user who participates in the multiplayer game, wherein the game management server comprises; an entry receiving unit operative to announce the multiplayer game to be held and to receive a request for participation to the multiplayer game from a user; an execution managing unit operative, when executing the multiplayer game, to transmit data for executing the multiplayer game to the terminal of one of the users who participate in the multiplayer game, operative to request the execution of the multiplayer game, and operative to acquire the result of the execution, and a result presenting unit operative to present the result of the execution, and the terminal comprises; an entry requesting unit operative to issue request for participation in the multiplayer game to the game management server; and a multiplayer game control unit operative, when requested to execute the multiplayer game from the game management server, to receive data for executing the multiplayer game, and operative to transmit an result of the execution to the game management server.

Optional combinations of the aforementioned constituting elements, and implementations of the invention in the form of methods, apparatuses, and systems may also be practiced as additional modes of the present invention.

According to the present invention, a technique for improving the convenience of a user of a network multiplayer game is provided.

BRIEF DESCRIPTION OF THE DRAWINGS

FIG. 5 shows an example of entry-reservation-receiving screen image presented by an entry-reservation-receiving unit; and FIG. 6 shows a procedure for executing a multiplayer game according to an embodiment.

1 game system, 2 internet, 10 game terminal, 20 controller, 30 input unit, 40 control unit, 41 local ranch managing unit, 42 race controlling unit, 43 net ranch controlling unit, 44 net meeting controlling unit, 60 parameter retaining unit, 66 image processing unit, 68 display apparatus, 70 communication unit, 110 game management server, 140 control unit, 141 net ranch managing unit, 142 shopping managing unit, 143 community managing unit, 144 net meeting managing unit, 145 meeting-holding-announcement-receiving unit 146, entry-reservation-receiving unit, 147 execution managing unit, 148 result presenting unit, 149 authentication unit, 160 user data base, 161 meeting data base, 170 communication unit.

BEST MODE FOR CARRYING OUT THE INVENTION

Figure 1:
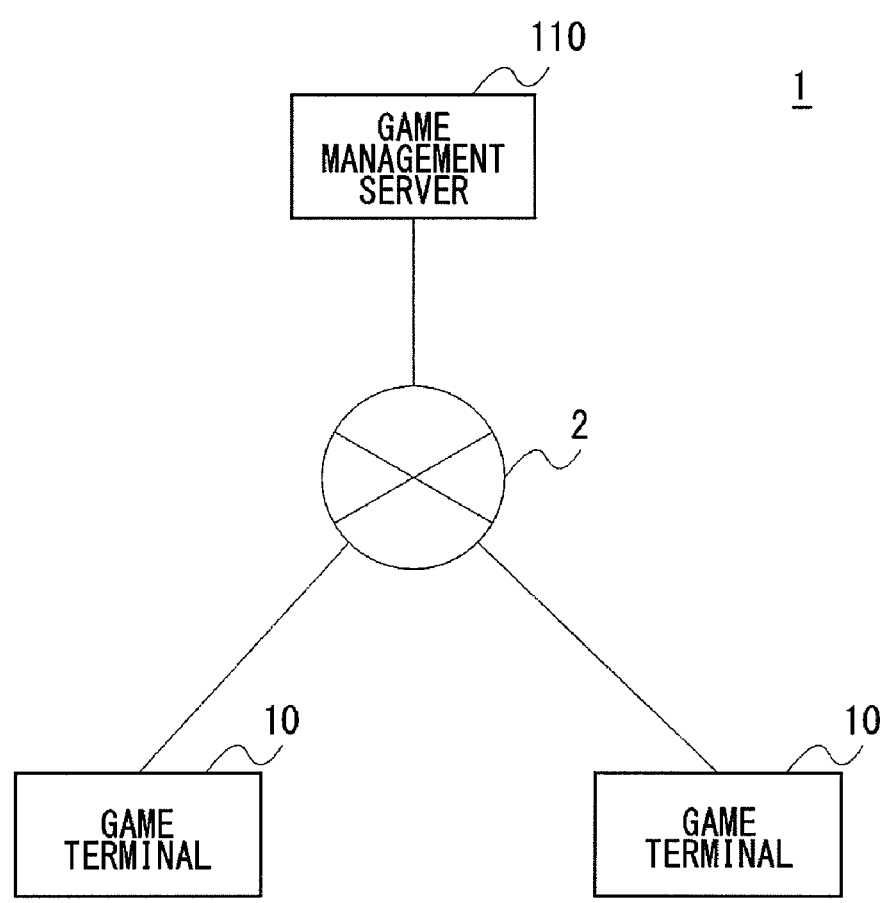
FIG. 1 shows the configuration of a game system according to an embodiment.

FIG. 1 shows the configuration of a game system according to an embodiment. A game system 1 according to the present embodiment allows a plurality of users to play a game via a network. In the game system 1, a game management server 110 that manages a game played by a plurality of users and a game terminal 10 of each user are connected with each other via the internet 2, which is one example of a network. The game terminal 10 may have wireless communication capabilities. In this case, the game terminal 10 may be connected to the internet 2 via a wireless LAN or the like.

The game terminal 10 has two types of game mode. One is a game mode where a user contends with, for example, an artificial intelligence (AI) character controlled by a game program locally. The other is a game mode where a user contends with another user via the game management server 110. The game management server 110 provides a place for a plurality of users to play with each other and supports communication among users via a multiplayer game. In an embodiment, an explanation will be given using a horseracing game as an example. In the horseracing game, a user acts as a horse owner and breeds and rears a racehorse and makes the horse run in a race so as to contend with another user.

Figure 2:
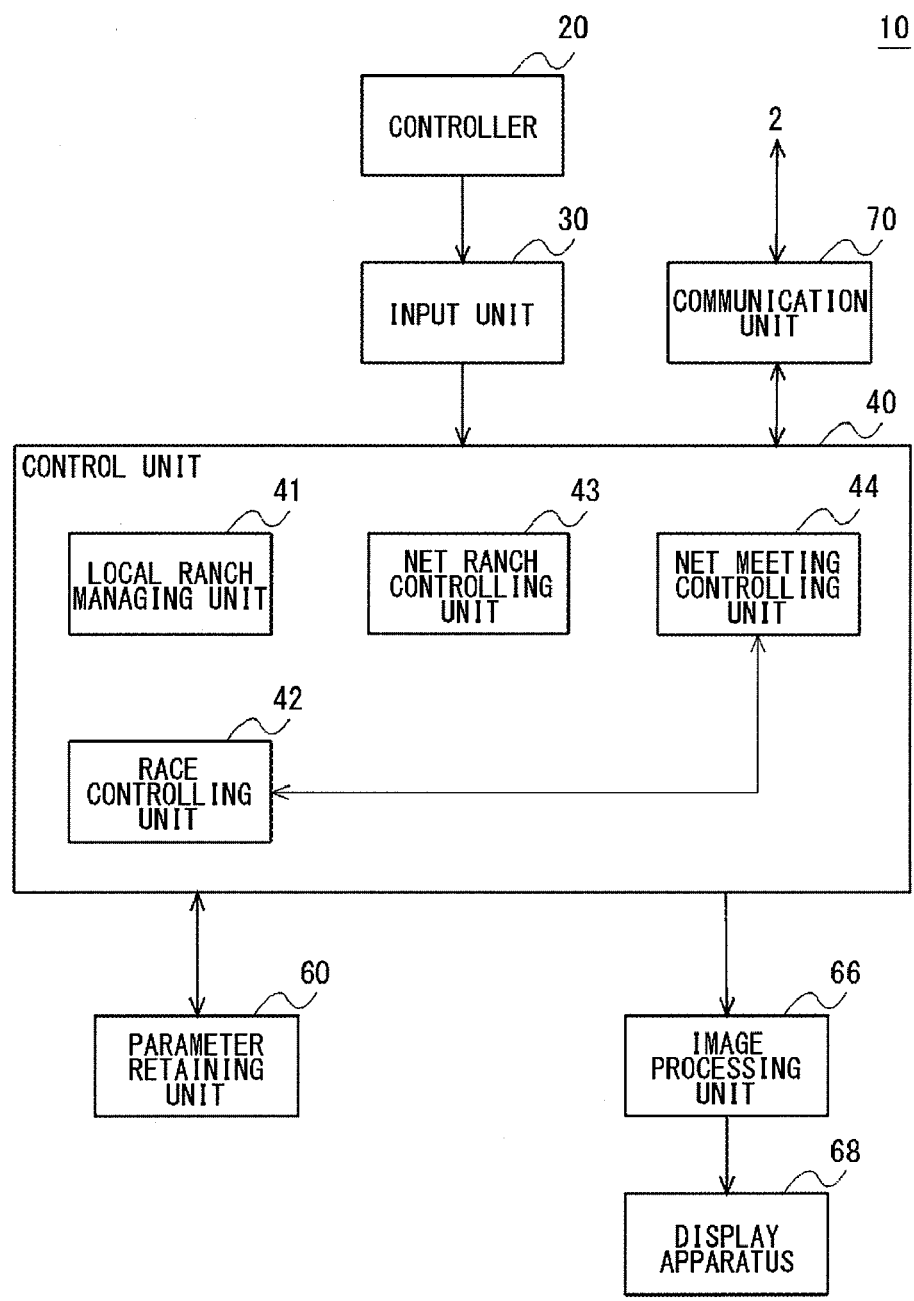
FIG. 2 shows the structure of a game terminal.

FIG. 2 shows the structure of the game terminal 10. The game terminal 10 comprises a controller 20, an input unit 30, a control unit 40, a parameter retaining unit 60, an image processing unit 66, a display apparatus 68, and a communication unit 70. These configuration may be implemented as for a hardware component, by elements such as a CPU of an arbitrary computer, a memory, a program loaded into a memory, or the like. FIG. 2 depicts functional blocks implemented by cooperation of these components. Therefore, it will be obvious to those skilled in the art that the functional blocks may be implemented in a variety of manners by a combination of hardware and software.

The input unit 30 receives a control signal input via the controller 20 manipulated by a user. The control unit 40 executes a game program based on an instruction from a user, the instruction having received by the input unit 30. The control unit 40 provides a function that allows a user to become a horse owner, rear horses and make them run in a race, etc. The parameter retaining unit 60 retains a parameter necessary for game progression. The image processing unit 66 generates an image plane of a game controlled by the control unit 40 and displays the image plane on the display apparatus 68. The communication unit 70 controls communication with other apparatuses via the internet 2.

The parameter retaining unit 60 retains parameters relating to a user, parameters relating to a horse, parameters relating to a horse race, and other parameters necessary for the progress of the game. The parameters relating to a user are, for example, the name of the horse owner, the name of the ranch, the type, number, and expiration date of items owned by the user, or the like. The parameters relating to the horse are, for example, the name of the horse, the sex, age, blood relationship, stamina, instantaneous force, intellectual ability, temper, physical condition, hunger level, and the award history, or the like. The parameters relating to the horse race are, for example, the name of the horserace track, the length of an individual course, the type of the course, the number of horses entering the race, or the like.

The local ranch managing unit 41 provides a ranch function for breeding a racehorse by breeding, rearing, feeding, and training a horse in a ranch, and manages and runs the ranch. In order to distinguish a ranch run by the local ranch managing unit 41 from a ranch opened in the game management server 110, which will be described later, the ranch in the game terminal 10 is referred to as a "local ranch", and a ranch in the game management server 110 is referred to as a "net ranch".

The local ranch managing unit 41 presents a menu of actions that can be selected by a user, the horse owner, and the unit receives an instruction for selecting from the user. The local ranch managing unit 41 allows the user to select an action, for example, for giving an item such as feed to a horse, for training a horse, for putting a horse out to pasture so that the horse can move and graze freely, for taking a horse to the net ranch in order to sell the horse, for making a horse run in a race held locally or via net, for mating a stallion and a brood mare, or the like.

According to the details of an action indicated by a user, the local ranch managing unit 41, displays, for example, animation showing a horse eating feed or displays animation showing a running horse, or the like on the image processing unit 66. The local ranch managing unit 41 changes the value of a parameter retained in the parameter retaining unit 60 as necessary. For example, if a feed is given to a horse, the parameter retaining unit 60 decreases the hunger level of the horse and increases the body condition of the horse. Further, if a horse is trained, the parameter retaining unit 60 increases the value of the parameters such as stamina, instantaneous force, intellectual ability, or the like.

The local ranch managing unit 41 provides a function of shops for a user to buy an item or the like. In the shop, a user can buy items, such as, feed, medicine, tack, or the like, in exchange for money used in the game. A user can buy items necessary to breed a horse at a shop provided by the local ranch managing unit 41. Alternatively, a user can obtain those items at a shop of another user opened in the game management server 110 or can obtain at a production facility provided in the game management server 110.

The local ranch also has a function to act as a production ranch, by which, a user can mate a stallion and a brood mare bought from another user in the game management server 110 so as to breed racehorses. It allows a user to experience a pseudo-feeling of an actual horse owner, such as the excitement and joy of, for example, obtaining a brood mare that has an advantage in a certain ability and obtaining a stallion that is excellent in another ability in order to breed an excellent racehorse of good blood.

When a user selects an action for transporting a horse to the net ranch in order to sell a stallion or pony or in order to make the horse run in a race, the local ranch managing unit 41 records information on the specified horse into the parameter retaining unit 60 and uploads the data on the specified horse to the game management server 110 the next time the terminal is connected with the game management server 110. Racehorses can be uploaded any number of times since they will come back to the local ranch after the race is finished. On the contrary, a stallion or pony disappears from the local ranch once uploaded and thus it cannot be uploaded a plurality of times. This is because the stallion or the pony is uploaded in order to sell. For each uploaded horse, an ID is given. Once a user sends a horse to the net ranch, that is, after the data on the horse is uploaded to the game management server 110, the uploading of the same horse is inhibited even if the user tries to reset the game in an effort to upload the same horse again. This is because a horse having the same ID is already uploaded to the net ranch. This restrains the upload of the same horse a plurality of times and thus restrains duplication of the horse.

A racehorse is uploaded to the game management server 110 not for the purpose of selling but for making the horse run in a race. Thus the horse should not be duplicated even if it is uploaded a plurality of times. As will be described later, the data of a racehorse is uploaded in order to join the race meeting, which is announced in the game management server 110 and will be held in the future. Thus, rather than controlling the racehorse by making it disappear from the local ranch when the horse is sent to the race meeting, it is more natural to control the racehorse by letting it remain in the local ranch while only the data on the racehorse is sent and only entry into the race is reserved. This also allows a user to make a reservation for the entry into a plurality of race meetings concurrently. Even in this case, it may be controlled so that the same horse cannot be made to run in a plurality of race meetings that are held at the same time or on the same date. When receiving the entry of racehorse, the game management server 110 may acquire the status of entries to other races and check whether or not the horse has entered to those other races that are held simultaneously with the race. Alternatively, the game terminal 10 may store the date and time of the race meeting to which the entry is made into the parameter retaining unit 60, or the like, and may ban additional entries to the race meetings that are held simultaneously when a user try to reserve additional entries.

When an action for making the racehorse run in a race meeting that is being held locally is selected, the local ranch managing unit 41 hands the controlling role to the race controlling unit 42.

The race controlling unit 42 controls a horse race. The race controlling unit 42 reads the parameter relating to the race from the parameter retaining unit 60, presents to a user a list of races for which entry is open, and receives instructions by the user to select a particular race. At this time, the race controlling unit 42 also presents to the user the conditions, such as, the name of the race, the name of the race track, the length of the course, the types of riding grounds, the footing of the riding grounds, the number of horses entering the race, or the like. This allows the user to select a race that has conditions with which his/her horse has an advantage.

After a user selects a race to make his/her racehorse run, the race controlling unit 42 generates parameters of other starters in order to hold the race. The race controlling unit 42 may determine the ability of other horses depending on the type of race. For example, in case of a GI race, a number of horses with excellent ability may be made to run in the race.

The race controlling unit 42 generates parameters of the starters, then calculates the results of the race according to a predetermined algorithm. The race controlling unit 42 may calculate the time change for each horse position or the velocity at predetermined time intervals, and may display the appearance of the race using the image processing unit 66. Further, the data obtained by the calculation, such as the position, the velocity, or the like of each horse, may be recorded in the parameter retaining unit 60 in order to allow instant replaying of the race afterwards. The results of the race may also be recorded in the parameter retaining unit 60.

After the race completes, the race controlling unit 42 gives prize money according to the results of the user's horse and records it in the parameter retaining unit 60. In this process, the value of the parameters indicating the ability of the horses may be changed. For example, in a case where the horse received an excellent result, the value of parameters, such as the parameter indicating stamina or intellectual ability, may be increased. Further, the result for the user's horse may be recorded in the parameter retaining unit 60. In this way, a user can enjoy the horse race in the viewpoint of a horse owner.

The game system 1 according to the present embodiment not only allows a user to make a racehorse that was reared with diligent care run in a race held in the game terminal 10, but it also provides a chance for the user to make the horse run in a race to which horses of other users enter. Further, the system provides a place where horses or items are sold and bought among users and where a community is made in order to exchange information or the like. The net ranch controlling unit 43 controls communication with the net ranch provided in the game management server 110. The net meeting controlling unit 44 controls the hosting of or entry into horse races held in the game management server 110. An explanation on these functions will be given later in detail with an explanation on the game management server 110.

Figure 3:
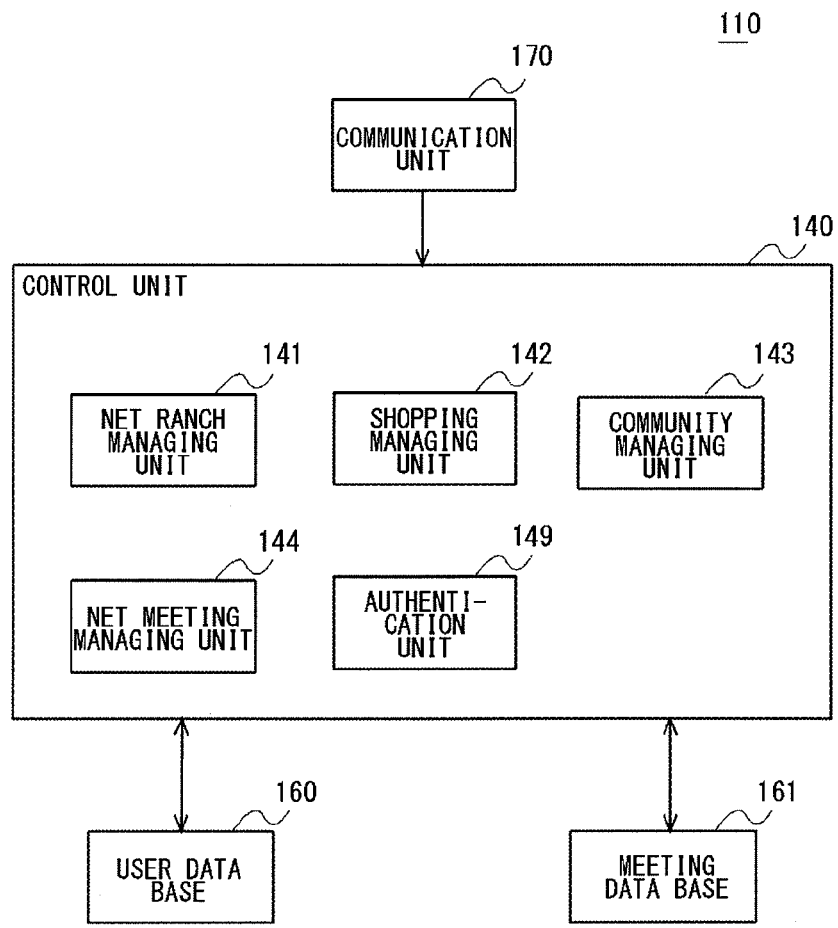
FIG. 3 shows the inner structure of a game management server.

FIG. 3 shows the inner structure of the game management server 110. The game management server 110 comprises; a control unit 140, a user database 160, a meeting database 161, and a communication unit 170. These configurations may also be implemented in a variety of manners by a combination of hardware and software.

The control unit 140 executes functions for supporting the communication among users through playing the multiplayer game, as well as provides a place for a plurality of users to contend with each other. The user database 160 stores information on a user who is registered in the service provided by the game management server 110. The meeting database 161 stores information relating to the multiplayer game managed by the game management server 110. The communication unit 170 controls communication with other apparatuses via the internet 2.

When there is an access from the game terminal 10 of a user, an authentication unit 149 authenticates whether or not the game terminal 10 is the terminal of a user who is qualified and registered. For a first time user, a user registration screen is presented, and an ID for identifying the user and the name of the net ranch are both received; and the ID and the name of the ranch are cross-checked with those of users that have been already registered in order to avoid overlaps, and the system also checks whether or not there is other problems. Then the user is registered in the user database 160. In this process, information that is unique to the game terminal 10, for example, the MAC address of the game terminal 10 or the like is acquired and registered in association with the user ID. When there is access from the game terminal 10, the authentication unit 149 acquires the MAC address of the game terminal 10, further receives an input ID of the user, and checks both by referring the user database 160. When authentication is successful, the list of the services provided by the game management server 110 is presented to the game terminal 10, and the selection instructions from a user are received.

The net ranch managing unit 141 manages and runs the net ranch. The net ranch is different from the local ranch in the way that it neither breeds nor rears horses, but it provides functions for cultivating farm products, for digging a mineral substance, for running the production facility for processing the obtained items, for keeping horses to be sold or bought by users temporarily, for opening shops for selling items that the user has obtained to other users, etc.

A user can provide a production facility to produce, for example, farm products, mineral substances, or the like, and the user can sell the resulting products to other users or download the resulting products to the local ranch in order to use them. Money obtained by selling the resulting products can be used in order to buy brood mares, stallions, and ponies. The net ranch managing unit 141 manages the elapsed time, more specifically, the unit consumes points given every day and executes the construction of the ranch, the production of farm products, etc. That is, the resulting products cannot be obtained instantly one right after the other. But the resulting products are obtained after a certain lapse of time, in actuality.

The net ranch managing unit 141 obtains the data of a horse uploaded from the local ranch in the game terminal 10 and keeps the data temporarily in the net ranch until the contract of sale is made. Further, when a user buys a horse from another user using the shopping function, which will be described later, the net ranch managing unit 141 acquires the data of the horse and keeps the data temporally in the net ranch until the data is downloaded to the local ranch. In case the user selects an action for transporting the horse retained in the net ranch to the local ranch, the net ranch managing unit 141 transports the data of the selected horse to the game terminal 10. This enables to rear a horse bought via the net in the local game terminal 10 or use the horse for reproduction purpose.

The shopping managing unit 142 provides a function for browsing a shop that other users opened in the net ranch, for buying an item or a horse that is on sale, for winning a bid at an auction for a horse set up by another user, etc. A user buys an item or a horse from another user and then the money that can be used in the game management server 110 is paid to the opponent user. This money may be set so that it can be used commonly with the local game terminal 10. Nevertheless, in the present embodiment, money usable in the game terminal 10 and the money usable in the game management server 110 are distinguishable from each other. Thus, in the present embodiment, the game management server 110 adopts a system whereby money is obtained by selling the resulting products, which are produced in a production facility in the net ranch, and the obtained money is used to buy a horse.

The community managing unit 143 provides a function for supporting communication among users. When a user is browsing a shop of another user, the community managing unit 143 allows the user to send a message to the other user or to request that the other user register in order to transmit messages when necessary.

The net meeting managing unit 144 manages a meeting being held in which a plurality of users participate and contend with each other. The net meeting managing unit 144 provides a function for allowing a user to host a meeting of its own or to join to a meeting held by another user. Further, the net meeting managing unit 144 provides a function for calling participants to a meeting to be held and for controlling the progress of the meeting when the meeting date arrives.

Figure 4:
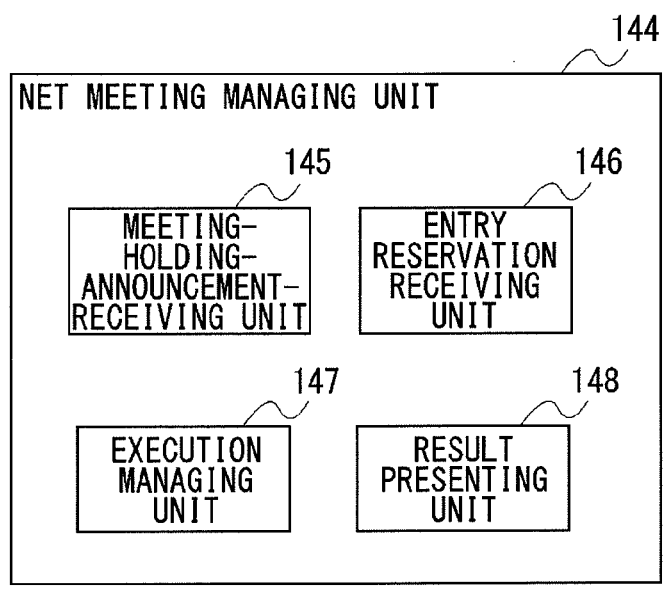
FIG. 4 shows the inner structure of a net meeting managing unit.

FIG. 4 shows the inner structure of the net meeting managing unit 144. The net meeting managing unit 144 includes a meeting-holding-announcement-receiving unit 145, an entry-reservation-receiving unit 146, an execution managing unit 147, and a result presenting unit 148. The net meeting managing unit 144 may have a function for generating and presenting an image screen in response to the request from the game terminal 10, done in a similar manner with that of the web server. The net meeting controlling unit 44 in the game terminal 10 may have a function for displaying the screen image presented by the net meeting managing unit 144 and a function for transmitting the request input from a button or input field provided on the screen plane, done in a similar manner with that of the web browser.

The meeting-holding-announcement-receiving unit 145 receives a prior notice that a user is going to hold a meeting and receives a request to call for entries. At this time, the meeting-holding-announcement-receiving unit 145 receives the date when the race meeting will be held, the closing date of the entry, the conditions relating to the race, conditions relating to the participants, and the like. The conditions relating to the race may be the name of the race, the name of a race track where the race is to be held, the length of the course, the types of riding grounds, the number of horses that may enter one race at a time, or the like. In a case of, for example, holding a tennis game meeting, the conditions may be the type of court, the number of sets, the number of games, or the like. Alternatively, in a case of holding a golf game meeting, the conditions may be the name of a course, the number of holes, or the like. In addition to these conditions, the meeting-holding-announcement-receiving unit 145 may receive the current weather, the footing of the riding grounds, or the like as the conditions relating to the race specified by the host. Alternatively, these conditions may be left as undetermined components, and the execution managing unit 147 may determine these conditions when the race meeting is held. The condition on participants may be set as the upper limit or the lower limit of the number of participants, the sex, age, the award history of an individual racehorse, or conditions relating to a user. On receiving information such as information on the date when the race meeting will be held, information on the conditions, or the like, the meeting-holding-announcement-receiving unit 145 registers the information in the meeting database 161.

The meeting-holding-announcement-receiving unit 145 receives prior notice of a meeting being held, then the entry-reservation-receiving unit 146 announces the prior notice of the meeting so that other users can view its information, and then it calls for participants on behalf of the host user. FIG. 5 shows an example of an entry-reservation-receiving screen image 200 presented by the entry-reservation-receiving unit 146. On the entry-reservation-receiving screen image 200, the expected date, the conditions of the meeting, or the like are displayed. On the entry-reservation-receiving screen image 200, a reception button 201 for receiving a reservation for entries from users is displayed. When a user clicks the reception button 201, the entry-reservation-receiving unit 146 receives the reservation of entry for that user. In the case where the conditions relating to the participant are set by the host user, the entry-reservation-receiving unit 146 determines whether a user who reserves an entry meets the qualifying conditions. When the conditions are met, the reservation of the user is permitted, and when not met, the reservation is rejected. The entry-reservation-receiving unit 146 acquires the data of the horse from the game terminal 10 of a user permitted to participate, and the unit registers the data in the meeting database 161. Taking in account that the body condition of the horse may change by the date the meeting is expected to be held, the entry-reservation-receiving unit 146 may change the value of parameters registered in the meeting database 161. Alternatively, the execution managing unit 147 may acquire the data of the horses from each game terminal 10 when executing the race, assuming the case where the users train their horses and strengthen their horse's condition by the date the meeting is expected to be held.

When the closing date for entries specified by the host user comes, the entry-reservation-receiving unit 146 closes the registration for those who wishes to participate, removes the reception button 201 from the entry-reservation-receiving screen image 200, and changes the message displayed to, for example, "entry closed", or the like. When the date comes for the meeting to be held, the control is moved from the entry-reservation-receiving unit 146 to the execution managing unit 147. This way, a user can entrust the management server 110 with a call for entries to the multiplayer game, the management of the game, or the like. Therefore, the user can enjoy playing the multiplayer game with other users easily. Once the host user declares the holding of the meeting or once a participant reserves his/her entry, both the host and the participant may disconnect the communication with the server until the date the meeting is expected to be held comes, and both do not have to wait. Thus, the users can carry the game terminal 10 around in order to rear a horse, enjoy the game in local mode, etc. Further, since the participant can reserve his/her entry, the problem of not being able to attend the meeting because other participants have already filled the maximum numbers of positions when the user accesses the server on the meeting date can successfully be avoided. Since the host can set conditions on the levels of the participants or the like, each participant can join the meeting aware of and subject to the set conditions, so that the participant can enjoy participating in a competition with opponents at a desired level. The entry-reservation-receiving unit 146 may remind the host user or the participant users of the meeting before the date the meeting is expected to be held using means of communication, such as an email or the like.

When the set date arrives for the meeting to be held, the execution managing unit 147 manages the execution of the race. Based on the number of the users who reserve an entry to participate, the execution managing unit 147 decides the method and mode of the race. For example, if the number of horses entering the race is twelve, and if the number of horses joining the meeting is forty-eight, four preliminary races may be performed, and then a final race may be performed with the top 3 horses in each preliminary race. Further, the execution managing unit 147 determines the bracket number of the horses or the like. At this time, conditions relating to the race, or the like are set if necessary. As described before, the host may not specify the weather conditions, the footing of the riding grounds at the time of the race, or the like beforehand. In this case, the execution managing unit 147 determines the weather conditions or the footing of the riding grounds by generating a random number, or the like. In case of other multiplayer games, the conditions of the game or rules are determined or matching combinations are made so as to prepare the start of the game, in a similar manner.

In the case of the horseracing game, a race is established even if the participant users are not present when the race is being held. Therefore, the execution managing unit 147 may execute the race automatically when the expected date of the meeting comes and may also make the result open so the host or the participants may view the result. However, in this case, the host user does almost nothing in order to hold the meeting except for declaring the meeting, and thus, the host user might experience merely a slight feeling that he or she is holding the meeting. Therefore, in the present embodiment, the data necessary for holding the meeting is sent to the game terminal 10 of the host user, in order to execute the race meeting at the game terminal 10 of the host user. This allows the host user to fully experience the excitement and joy that accompanies the coordination and execution of the meeting.

FIG. 6 shows the procedure for executing the multiplayer game according to the present embodiment. The meeting-holding-announcement-receiving unit 145 in the game management server 110 receives prior notice of the meeting being held from the game terminal 10 (S2), and then the entry-reservation-receiving unit 146, on behalf of the host, makes the prior notice of the meeting open so that other users can view it and puts up a call to participate (S4). The entry-reservation-receiving unit 146 receives entry reservations for the meeting from the game terminal 10 (S6), and then the entry-reservation-receiving unit 146 acquires the data of the horse that will run in the race from the game terminal 10 of the participant and registers the data in the meeting database 161 (S8).

When the date arrives for the meeting to be held, the execution managing unit 147 generates the data necessary for holding the meeting as described above, and waits until the host user makes an access to the game management server 110 (S10). When the host user accesses the game management server 110 from the game terminal 10 and when the net meeting controlling unit 44 displays the entry-reservation-receiving screen image 200, the meeting execution button 202 is displayed in the field that indicates the meetings being held by the user himself/herself as shown in FIG. 5. Then the user requests to execute the meeting by clicking the button (S12). The execution managing unit 147 transmits data, necessary for executing the meeting, to the game terminal 10 (S14).

When the net meeting controlling unit 44 completes downloading the data, the unit disconnects the communication temporarily (S16). This is for the sake of releasing resources that have been used for communication purposes and for making use of the resources of the game terminal 10 effectively when executing the meeting. In case the game terminal 10 has enough resources, the net meeting controlling unit 44 may proceed to a next step while maintaining the connection. The net meeting controlling unit 44 makes the race controlling unit 42 execute the race based on the downloaded data (S18). When the preliminary races and the final race are set as described before, the preliminary races are executed first. Then, based on the result thereof, the final race is executed. Differing from the usual local game mode, the appearance of the race is not displayed in this case. This is in order to deter the host user from re-executing the race by resetting or from not uploading the result of the race execution to the game management server 110 when the host user acquires the result of a race that is not favorable to him/her.

When the net meeting controlling unit 44 completes the execution of all of the races, the unit generates the result data of the meeting and reconnects with the game management server 110 (S20). When succeeding in the reconnection, the net meeting controlling unit 44 uploads the result data of the race meeting to the game management server 110 (S22). The result presenting unit 148 generates an image screen for presenting the result based on the acquired result data of the meeting and displays the image screen (S24). At this point in time, the host user can view the result of the meeting for the first time (S26). After this, the participants can access the image screen presenting the result and can view the result of the meeting at any given time (S28). In another example, when executing the meeting at the game terminal 10 of the host user, the result may be displayed in a similar manner with that of the usual game mode so that the host user can see the result. Alternatively, the result of the race may be distributed to respective game terminals 10 of the race participants directly from the game terminal 10 of the host user.

In this way, by allowing the host user to execute the race and to calculates the result by himself/herself, the host user has a sense of accomplishment. In order to reduce the number of cases where the host user does not execute the meeting or does not upload the result, a premium or a rare item may be given in exchange for the execution of the meeting. Alternatively, if the host user does not upload the result during a predetermined period of time, another user or an operations director of the game management server 110 may be allowed to execute the meeting and upload the result on behalf of the host user.

Information indicating the level of reliability of the host user may be presented in the entry-reservation-receiving screen image 200. For example, the number of meetings hosted by the user in the past and the number of meetings of which the result has been uploaded in actuality may be presented so that users can determine whether or not the host user executes a meeting properly.

Given above is an explanation based on the embodiment. This embodiment is intended to be illustrative only, and it will be obvious to those skilled in the art that various modifications to constituting elements and processes could be developed and that such modifications are also within the scope of the present invention.

INDUSTRIAL APPLICABILITY

The present invention is applicable to a game managing server or a game system that implement a multiplayer game via a network.

The invention claimed is:
1. A game management server comprising;
  a game-holding-prior-notice-receiving unit operative to receive a prior notice of a multiplayer game being held that does not need manipulation from a user, including a date and time the multiplayer game is expected to be held and a request to call for entries to the multiplayer game from a terminal of a user who hosts the multiplayer game via a network and operative to register the received date and time in a database comprised in a computer;

an entry-reservation-receiving unit operative to read the date and time the multiplayer game is expected to be held from the database, and operative to make the prior notice including the date and time the multiplayer game is expected to be held open via the network, and operative to receive an entry reservation for the multiplayer game from a terminal of a user who will participate in the multiplayer game by receiving data necessary for progression of the multiplayer game from the terminal and registering the received data in the database; and a game management unit operative to, when the date and time the multiplayer game is expected to be held arrives, read the data necessary for progression of the multiplayer game received from the terminal of the user who will participate in the multiplayer game from the database and send the data to the terminal of the user who hosts the multiplayer game in order to execute the multiplayer game at the terminal of the user who hosts the multiplayer game; and a result presenting unit operative to acquire a result after the execution of the multiplayer game from the user who hosts the multiplayer game and to make the result of the execution open to view via the network.

2. The game management server according to claim 1, wherein the game-holding-prior-notice-receiving unit receives a rule or a condition associated with the multiplayer game and registers the received rule or condition in the database, the entry-reservation-receiving unit reads the received rule or condition from the database and presents the received rule or condition along with the prior notice of the game to be held, and the game management unit reads the rule or condition from the database and sends the rule or condition to the terminal of the user who hosts the multiplayer game.

3. The game management server according to claim 1, wherein the game management unit determines matching combinations among users who made the entry reservation and makes users selected for the matching combinations contend with each other.

4. The game management server according to claim 1, wherein the multiplayer game is a horse racing game that makes a horse character run in a race, the horse being reared by the user, the entry-reservation-receiving unit acquires data on a horse that will run in the race from the terminal of a user who will participate in the multiplayer game and registers the acquired data in the database, the game management unit reads the data on the horse that will run in the race from the database and sends the data to the terminal of the user who hosts the game and allows the terminal to execute the race, and the result presenting unit acquires a result of the race and makes the result open to view.

5. The game management server according to claim 1, wherein, when the entry-reservation-receiving unit receives the entry reservation for the multiplayer game from the terminal of the user, the entry-reservation-receiving unit reads the status of entries to other multiplayer games of the user and checks whether or not the user has entered to those other multiplayer games that are held simultaneously with the multiplayer game, and bans a plurality of entries to the plurality of the multiplayer games that are held simultaneously.

6. A game system comprising;

a game management server operative to manage a multiplayer game to be held that does not need manipulation from a user; and a terminal of a user who participates in the multiplayer game, wherein the game management server comprises;

a game-holding-prior-notice-receiving unit operative to receive a prior notice of a multiplayer game being held that does not need manipulation from a user, including a date and time the multiplayer game is expected to be held and a request to call for entries to the multiplayer game from a terminal of a user who hosts the multiplayer game via a network, and operative to register the received date and time in a database comprised in a computer;

an entry-reservation-receiving unit operative to read the date and time the multiplayer game is expected to be held from the database, and operative to make the prior notice including the date and time the multiplayer game is expected to be held open via the network, and operative to receive an entry reservation for the multiplayer game from a terminal of a user who will participate in the multiplayer game by receiving data necessary for progression of the multiplayer game from the terminal and registering the received data in the database;

a game management unit operative to, when the date and time the multiplayer game is expected to be held arrives, read the data necessary for progression of the multiplayer game received from the terminal of the user who will participate in the multiplayer game from the database and send the data to the terminal of the user who hosts the multiplayer game in order to execute the multiplayer game at the terminal of the user who hosts the multiplayer game; and a result presenting unit operative to acquire a result after the execution of the multiplayer game from the user who hosts the multiplayer game and to make the result of the execution open to view via the network, and the terminal of the user who participates in the multiplayer game comprises;

a net meeting controlling unit operative to display the prior notice including the date and time the multiplayer game is expected to be held presented by the entry-reservation-receiving unit and operative to request the entry reservation for the multiplayer game to the game management server by sending data necessary for progression of the multiplayer game to the game management server.

7. A game control method comprising;

a net meeting controlling unit comprised in a terminal of a user who hosts a multiplayer game that does not need manipulation from a user requesting a game management server operative to manage the multiplayer game to call for entries to the multiplayer game by sending a prior notice of the multiplayer game being held including a date and time the multiplayer game is expected to be held via a network;

a game-holding-prior-notice-receiving unit comprised in the game management server receiving the prior notice including the date and time and the request to call for entries and registering the received date and time in a database comprised in a computer;

an entry-reservation-receiving unit comprised in the game management server reading the date and time the multiplayer game is expected to be held from the database, and making the prior notice including the date and time the multiplayer game is expected to be held open via the network;

a net meeting controlling unit comprised in a terminal of a user who participates in the multiplayer game displaying the prior notice including the date and time the multiplayer game is expected to be held presented by the game management server;

the net meeting controlling unit comprised in the terminal of the user who participates in the multiplayer game requesting an entry reservation for the multiplayer game to the game management server by sending data necessary for progression of the multiplayer game to the game management server;

the entry-reservation-receiving unit comprised in the game management server receiving the entry reservation for the multiplayer game from the terminal by receiving the data necessary for progression of the multiplayer game from the terminal and registering the received data in the database;

a game management unit comprised in the game management server reading, when the date and time the multiplayer game is expected to be held arrives, the data necessary for progression of the multiplayer game received from the terminal of the user who will participate in the multiplayer game from the database and sending the data to the terminal of the user who hosts the multiplayer game in order to execute the multiplayer game at the terminal of the user who hosts the multiplayer game;

the net meeting controlling unit comprised in the terminal of the user who hosts the multiplayer game executing the multiplayer game based on the data necessary for progression of the multiplayer game received from the game management server;

the net meeting controlling unit comprised in the terminal of the user who hosts the multiplayer game sending a result after the execution of the multiplayer game to the game management server; and the game management unit comprised in the game management server acquiring the result after the execution of the multiplayer game from the terminal of the user who hosts the multiplayer game and making the result of the execution open to view via the network.

* * * * *

UNITED STATES PATENT AND TRADEMARK OFFICE
CERTIFICATE OF CORRECTION

PATENT NO. : 7,798,906 B2  Page 1 of 1
APPLICATION NO. : 12/187629
DATED : September 21, 2010
INVENTOR(S) : Yoshinori Kotsugai et al.

It is certified that error appears in the above-identified patent and that said Letters Patent is hereby corrected as shown below:

Title page Add

Item

--(30)   Foreign Application Priority Data

February 10, 2006   JP   2006-034470
      February 16, 2006   JP   2006-039734--.

--(86)   PCT No.:   PCT/JP2006/318990

§371 (c)(1),
(2), (4) Date:   September 25, 2006--.

Signed and Sealed this

Seventh Day of December, 2010

David J. Kappos
*Director of the United States Patent and Trademark Office*